United States Patent [19]

Shin et al.

[11] Patent Number: 5,101,480
[45] Date of Patent: Mar. 31, 1992

[54] HEXAGONAL MESH MULTIPROCESSOR SYSTEM

[75] Inventors: Kang G. Shin, Ann Arbor, Mich.; Ming-Syan Chen, Yorktown Heights, N.Y.; Dilip D. Kandlur, Ann Arbor, Mich.

[73] Assignee: The University of Michigan, Ann Arbor, Mich.

[21] Appl. No.: 349,370

[22] Filed: May 9, 1989

[51] Int. Cl.⁵ .............................................. G06F 13/38
[52] U.S. Cl. .............................. 395/325; 364/DIG. 1; 364/284.4; 364/229.3; 364/228.3; 364/229.4
[58] Field of Search ................................. 364/200, 900

[56] References Cited

U.S. PATENT DOCUMENTS

| | | | |
|---|---|---|---|
| 3,794,983 | 4/1973 | Sahin | 370/54 |
| 4,641,237 | 2/1987 | Yabushita et al. | 364/200 |
| 4,835,732 | 5/1989 | Huberman et al. | 364/900 |
| 4,922,408 | 5/1990 | Davis et al. | 364/200 |
| 4,922,418 | 5/1990 | Dolecek | 364/200 |
| 4,943,909 | 7/1990 | Huang | 364/200 |

Primary Examiner—Thomas M. Heckler
Attorney, Agent, or Firm—Rohm & Monsanto

[57] ABSTRACT

An interconnection network for a plurality of process nodes, each illustratively comprised of a processor-memory pair, utilizes an hexagonal mesh arrangement of size n which is wrapped in each of the x, y, and z directions. In accordance with the invention, a unique address value is assigned to each processor node in the network, beginning at a central processor node and continuing along the x direction, and via the wrapping links, until each such processor node has a unique sequential address. Each of the rows, having first and last processor nodes therein, is wrapped by coupling each of the last processor nodes in each row to a respective first processor node in a corresponding row which is n-1 rows away. Point-to-point communication is achieved using the unique addresses of only the source and destination processor nodes, without requiring each intermediate processor node to contain global information about the entire network. An algorithm computes the shortest path between the source and destination processor nodes, in terms of the minimum number of processors which must be encountered by the message as it proceeds along the x, y, and z directions of the network toward the destination processor node. Each intermediate processor node updates the routing information. Point-to-point communication is also used to effect a broadcasting of a message from a source processor node to every other processor node in the network.

20 Claims, 10 Drawing Sheets

EDGES IN THE X-DIRECTION

EDGES IN THE Y-DIRECTION

EDGES IN THE Z-DIRECTION

An H₄

An H₄(11)

HEXAGONAL MESH MULTIPROCESSOR SYSTEM

GOVERNMENT RIGHTS

This invention was made under contract awarded by the Office of Naval Research, Control Number N00014-85-K-0122. The government has certain rights in the invention.

BACKGROUND OF THE INVENTION

This invention relates generally to systems for interconnecting processors, and more particularly, to a system which can be implemented in an integrated circuit for addressing, routing, and broadcasting information among a plurality of processors which are interconnected with each other in a hexagonal mesh multiprocessor arrangement.

The proliferation in recent years of powerful microprocessors and memory chips has resulted in considerable interest in the design and use of multiprocessor interconnection networks. Such networks are often required to connect thousands of homogeneously replicated processor-memory pairs, each of which is denominated a "processing node." In such systems, all synchronization and communication between processor nodes for program execution is often done via message passing. This is preferred over employment of a shared memory, as considerable difficulties would be encountered in the accessing of a memory system by a multiplicity of processors.

It is important that processing nodes in an interconnection network be homogeneous. This permits significant cost-performance benefits to be achieved, at least in part as a result of the inexpensive replication of multiprocessor components. Preferably, each processor node in the multiprocessor environment has fixed connectivity so that standard VLSI chips can be used. Moreover, the interconnection network should preferably contain a reasonably high degree of redundancy so that alternative routes can be made available to detour faulty processor nodes and links. More importantly, the interconnection network must facilitate efficient routing and broadcasting so as to achieve high performance in job executions.

A variety of multiprocessor interconnection systems have been proposed in the literature. However, most of them are not satisfactory, primarily as a result of their inability to provide satisfactory performance in all of the following: A satisfactory multiprocessor interconnection scheme should provide simplicity of interconnection, efficient message routing and broadcasting, a high degree of fault tolerance, and fine scalability, as measured in terms of the number of processor nodes necessary to increase the network's dimension by one. There is, therefore, a need for a multiprocessor interconnection scheme which performs satisfactorily in all of the foregoing areas of concern.

It is, therefore, an object of this invention to provide a system for interconnecting multiple processor nodes which is useful in real-time computing.

A still further object of this invention is to provide a simple and efficient system for message-broadcasting in a multiprocessor network.

An additional object of this invention is to provide a simple addressing scheme for a network of interconnected processor nodes, wherein such addresses can be utilized for computing message paths.

Yet another object of this invention is to provide a message routing scheme for a multiprocessor arrangement wherein message path computation is essentially insensitive to the size of the network.

A yet further object of this invention is to provide a message broadcasting scheme wherein the entire multiprocessor interconnection network can be covered in relatively few steps.

SUMMARY OF THE INVENTION

The foregoing and other objects are achieved by this invention which provides, in a first method aspect thereof, a method of communicating among each of p processor nodes, where $p=3n^2-3n+1$ processor nodes. In accordance with the invention, the processor nodes are interconnected with one another in an hexagonal mesh arrangement in which each edge of the hexagonal mesh has n processor nodes therein. The value of n therefore corresponds to the size of the hexagonal mesh arrangement. The process invention continues with the step of defining a plurality $(2n-1)$ x-rows of processor nodes in an x direction. The $2n-1$ x-rows are designated by an associated address of 0, to an address designated by a value corresponding to $2n-2$. A central one of the $2n-1$ x-rows is designated by a value corresponding to $n-1$. Each of the x-rows has first end and second end processor nodes therein. Subsequently, the x-rows are wrapped by coupling each of the second end processor nodes in each x-row to a respective first end processor node in an x-row which is $(n-1)$ modulo $(2n-1)$ x-rows away. In similar manner, $2n-1$ y-rows are defined in a y direction, which is oriented at a rotation of 60° with respect to the x direction. The $2n-1$ y-rows are designated by addresses of 0 to $2n-2$, the central row corresponding to a value $n-1$. The y-rows are wrapped by coupling respective second end processor nodes in each y-row to a respective first end processor node in a y-row which is $(n-1)$ modulo $(2n-1)$ y-rows away. This process is repeated for a z direction which is rotated by $-60°$ with respect to the x direction. The $2n-1$ z-rows are addressed and wrapped as described hereinabove with respect to the x-rows and the y-rows. In this manner, a wrapped hexagonal mesh arrangement is produced.

In accordance with this embodiment of the invention, a memory model of the wrapped hexagonal mesh arrangement is stored in a memory which is associated with at least one of the processor nodes which is desired to be a message-transmitting processor node. The memory model of the wrapped hexagonal mesh arrangement is then rotated, illustratively by shifting the data corresponding to the processor nodes, along the wrapped x-rows until the message-transmitting one of the processing nodes is arranged in a central location of the memory model. In a preferred embodiment, the central location corresponds to the particular processor node location where the central x-row, the central y-row, and the central z-row intersect one another.

In the practice of the invention, the method continues with the step of transmitting from the message-transmitting processor node a message intended to be received by a predetermined receiver processor node. The transmitted message has associated therewith routing data which identifies a message path which is to be followed by the message as it travels toward the receiver processor node.

In a preferred embodiment of the invention, the message path data is transmitted concurrently with the message itself, and corresponds to the distances to be traveled by the message along the x, y, and z directions. In one embodiment, the distances are specified in terms of numbers of processor nodes which are to be encountered in each such direction. As the message reaches each intermediate processor node, the path, or route data, is updated, illustratively by decrementing the processor node count data associated with the particular direction from which the message and routing data was received. Thus, the routing data includes x-data corresponding to a number of processor nodes encountered by the message along an x direction of the message path, y-data corresponding to a number of processor nodes encountered by the message along a y direction of the message path, and z-data corresponding to a number of processor nodes encountered by the message along a z direction of the message path.

In one specific and highly advantageous embodiment of the invention, prior to the transmission of the message and the routing data there are performed the steps of assigning each of the processor nodes in the hexagonal mesh arrangement a unique address value. The address values are assigned sequentially from a central processor node location where the central rows of each direction intersect one another, and proceed sequentially in value along all of the x-wrapped x-rows to a final processor node location. In practice, the final processor node location will be arranged immediately prior to returning to the originating, or central, processor node location. In this embodiment, the routing data corresponding to the message path to be taken by the message to the receiver processor node is responsive to the sequential address values.

The parameters $m_x$, $m_y$, and $m_z$ correspond to the number of processor nodes which will be encountered by the message along the respective direction of the message path. Initially, these parameters are preset to 0. The computation of values for these parameters proceeds as follows:

n-setting a parameter n to a value corresponding to the number of processor nodes along an edge of the hexagonal mesh arrangement;

p-setting a parameter p to a value $3n^2-3n+1$ corresponding to the number of the processor nodes in the hexagonal mesh arrangement;

s-setting a parameter s to a value corresponding to the unique address value of the message-transmitting processor node;

d-setting a value d as the unique to a value corresponding to the unique address value of a destination processor node, the characteristic message path being between the message-transmitting processor node having address s and the receiver processor node having address d;

k-setting a parameter k to a value corresponding to $k=[d-s]$ modulo p;

comparing k to n; and if $k<n$, x-setting $m_x=k$, and if $k>3n^2-4n+1$, x-setting $m_n=3n^2-3n+1$, where $m_x$ is a number of processor nodes encountered by the message along an x-direction of the characteristic message path.

The hexagonal mesh arrangement is then divided into first and second parts, the first part corresponding to x-rows 0 to $n-2$, and the second part corresponding to x-rows n to $2n-2$. In a specific illustrative embodiment of the invention, a parameter r is defined corresponding to a value $(k-n/3n-2)$ a further parameter t is defined to correspond to a value $k-n$ modulo $3n-2$. When the receiver processor node is located in the first part of the hexagonal mesh arrangement, the computation process continues by resetting:

$m_x=t-r$ and $m_z=n-r-1$ if $t\leq n+r-1$ and $t\leq r$;

$m_x=t-n+1$ and $m_y=n-r-1$ if $t\leq n+r-1$ and $t\geq n-1$; and $m_y=t-r$ and $m_z=n-t-1$ if $t\leq n+r-1$ and $t<n-1$ and $t>n$.

However, if the receiver processor node is in the second part of the hexagonal mesh arrangement, then the computations proceed by resetting:

$m_x=t+2-2n$ and $m_y=-r-1$ if $t>n+r-1$ and $t\leq 2n-2$;

$m_x=t-2n-n+1$ and $m_z=-r-1$ if $t>n+r-1$ and $t\geq 2n+r-1$; and $m_y=t+1-2n-r$ and $m_z=2n-t-2$ if $t>n+r-1$ and $t<2n+r-1$ and $t>2n-2$.

In a specific illustrative embodiment of the invention which is useful for broadcasting a message from a transmitter processor node to every other node in the network, the processor nodes are interconnected as discussed hereinabove, and x-rows and y-rows are defined in the hexagonal mesh arrangement. The rows are wrapped to produce a wrapped hexagonal mesh arrangement. In this method embodiment of the invention, a message is broadcast from the message-transmitting processor node. However, prior to such transmission, a plurality of hexagonal rings are defined in the hexagonal mesh arrangement, which rings are substantially concentric about the message-transmitting processor node. Each such ring contains a plurality of processor nodes which are of equal distance from the message-transmitting node. Thus, in the hexagonal mesh arrangement, each ring has six corner nodes, and transmission of the message proceeds from the message-transmitting processing node toward the periphery of the hexagonal mesh arrangement.

In the transmission of the message, the message is first transmitted to a predetermined number of nearest processor node neighbors of the originating processor node. Subsequently, the message is retransmitted from further originating processor nodes which are located at the corners of the hexagonal ring, to a neighboring processor node. In this manner, propagation of the message proceeds outward toward the periphery of the hexagonal mesh arrangement from the corner nodes of the hexagonal rings. However, the message also is propagated along each ring with the processor nodes intermediate of the corner nodes, in a direction corresponding to the direction from which the message was received.

In accordance with a further method aspect of the invention, a method of communicating among a plurality of processor nodes includes the following steps:

First, the processor nodes are interconnected to one another in an hexagonal mesh arrangement ($H_n$) in which each edge of the hexagonal mesh has n processor nodes therein, and x, y, and z directions are defined therein. A plurality of rows of the processor nodes are defined in the x, y, and z directions, whereby a plurality of x-rows, y-rows, and z-rows, each of the rows having first end and second end processor nodes therein. The rows in the x, y, and z directions are wrapped by coupling each of the second end processor nodes in each such defined row to a respective first end processor node in a corresponding type of row which is $n-1$ such rows away. Then, each of the processor nodes is assigned a unique address value, the address values being, in a specific illustrative embodiment of the invention, sequential from a central processor node location where a center ones of the x-, y-, and z-rows intersect one another, to a final processor node location. The hexagonal mesh arrangement is then rotated, or shifted, along the x-wrapped x-rows whereby the message-transmitting processor node, retaining its unique address value associated therewith, assumes the central processor node location in the hexagonal mesh arrangement.

In an environment where it is desired to transmit a message from the message-transmitting processor node to a specific receiver processor node, the receiver processor node must be identified using its unique address value which, as previously indicated, is assigned sequentially along the x direction. The message-transmitting processor node computes data which defines a message path between the message-transmitting processor node and the receiver processor node. The message path data is arranged in terms of minimum numbers of processor node jumps along the x, y, and z directions of the hexagonal mesh arrangement. As previously indicated, as the message is propagated along the message path, the routing data is continuously updated by the intermediate processor nodes such that as the message is retransmitted, the concurrent routing data corresponds to the remaining portion of the message path to be traversed by the message. It is evident from the foregoing that the formulation of the data corresponding to the message path is responsive exclusively to the sequentially assigned address values. Such simplicity of computation affords a significant reduction in computation time and overhead permitting rapid distribution of messages throughout the network.

BRIEF DESCRIPTION OF THE DRAWING

Comprehension of the invention is facilitated by reading the following detailed description, in conjunction with the annexed drawing, in which.

DETAILED DESCRIPTION

Figure 1:
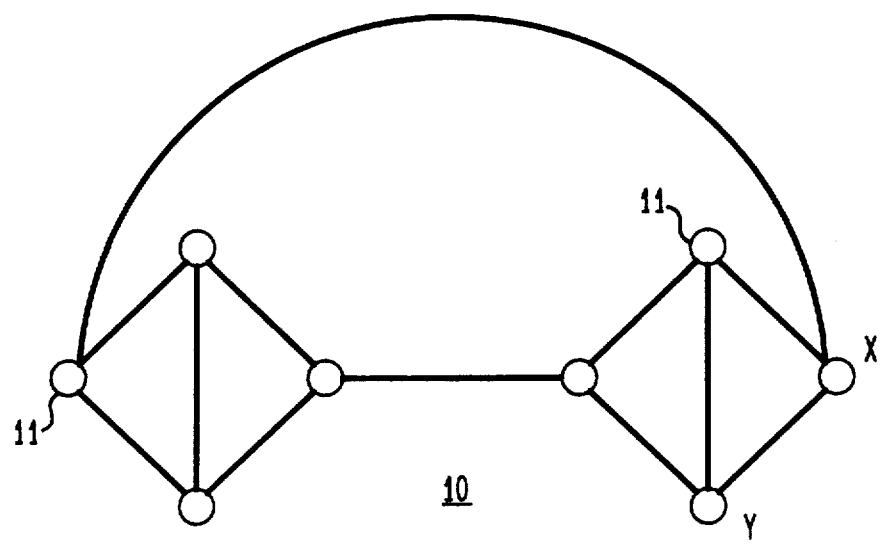
FIG. 1 is a schematic representation of a regular, nonhomogeneous graph arrangement of processor nodes.

FIG. 1 is a schematic representation of a regular, nonhomogenous interconnection graph 10 which is formed of a plurality of processor nodes 11 coupled to one another. An interconnection graph is said to be "regular" if all of the processor nodes in the graph have the same degree, and "homogenous" if all of the nodes are topologically identical. Although homogeneity implies regularity, the converse does not always hold true. For example, interconnection graph 10 is regular, but not homogenous since node x and node y are not topologically identical.

Figure 2:
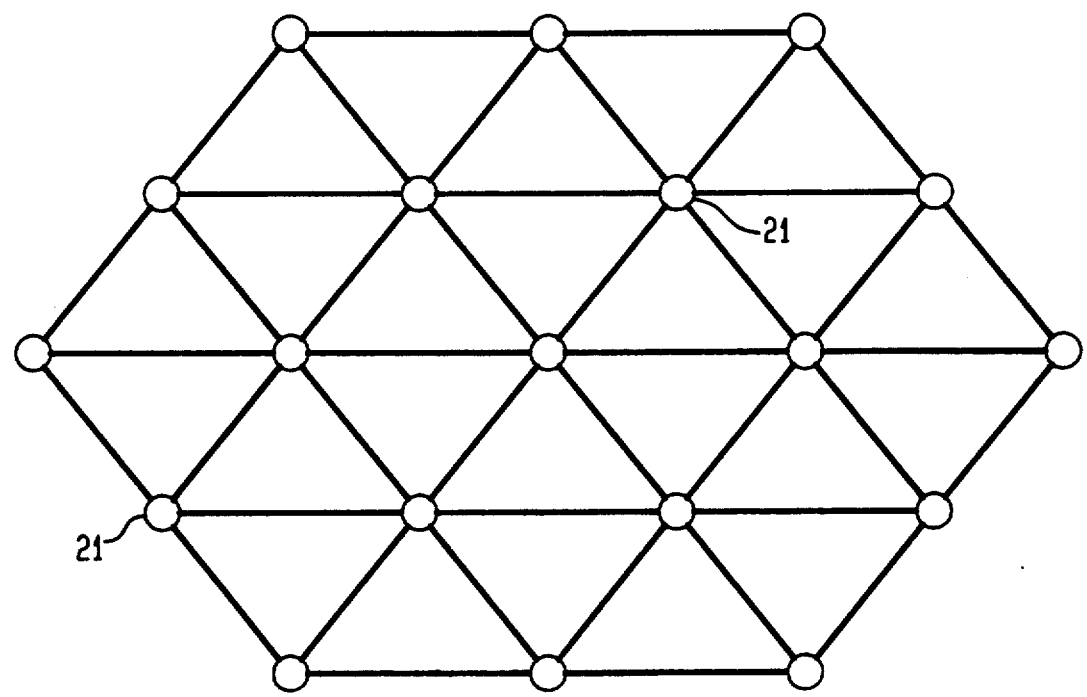
FIG. 2 is a schematic representation of an hexagonal mesh arrangement of size 3, shown without wrapping of the rows.

FIG. 2 is a schematic representation of an hexagonal mesh arrangement 20 formed of a plurality of processor nodes 21 which are interconnected with each other. All of processor nodes 21, except those disposed on the periphery of hexagonal mesh arrangement 20 are of degree six. Hexagonal mesh 20 is of size 3 (n=3) since three processor nodes are present on each outer edge thereof.

Figure 3:
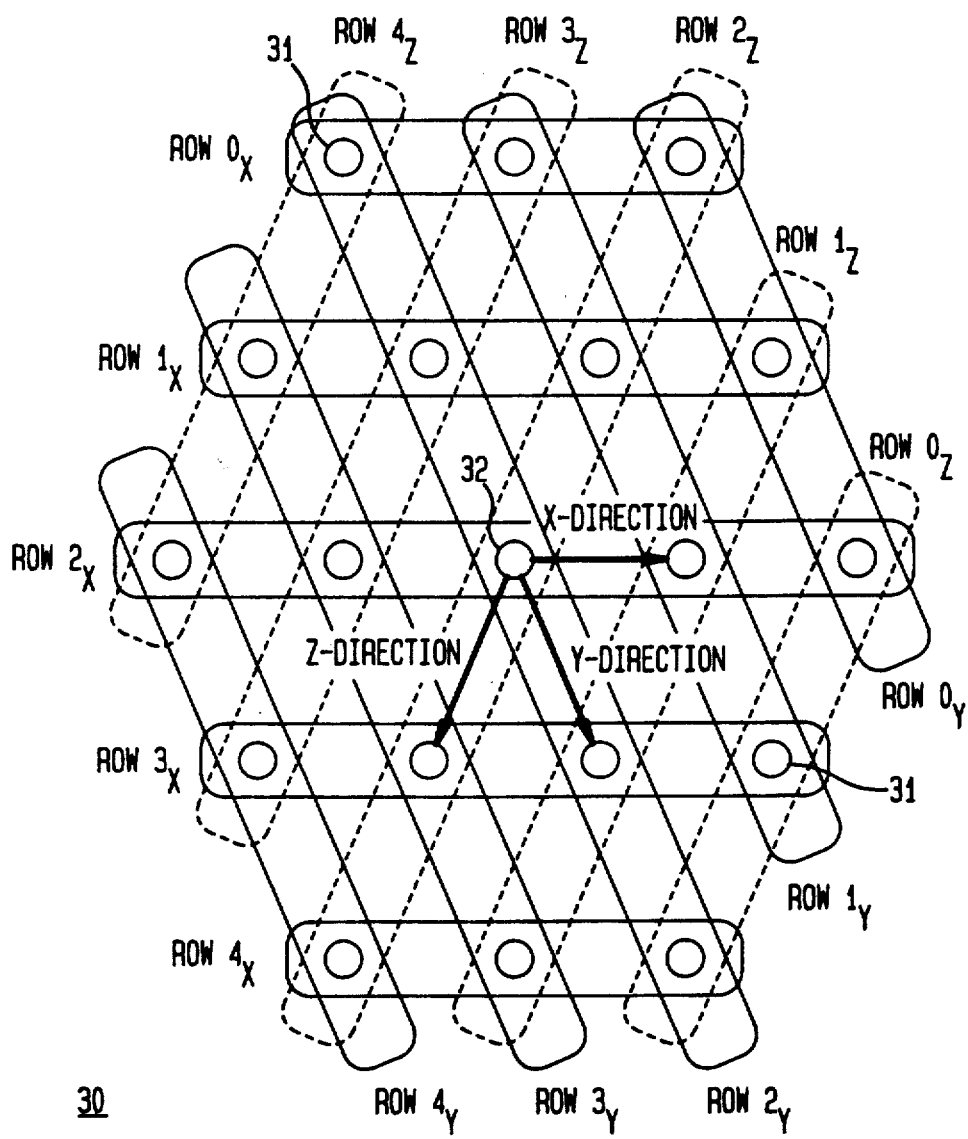
FIG. 3 is a schematic representation of an hexagonal mesh arrangement of size 3 showing the x, y, and z directions, as well as the x, y, and z-rows.

FIG. 3 is a schematic representation of an hexagonal mesh arrangement 30 which has been partitioned into a plurality of rows in the x, y, and z directions. Hexagonal mesh 30 is formed of a plurality of processor nodes 31 which are not shown in this figure, for sake of simplicity of the representation, to be connected to one another. In addition, hexagonal mesh 30 has a central processor node 32 which has six oriented directions, each of which leads to one of its six nearest neighbors. Any of the six directions can be defined as the x direction, the direction 60° clockwise to the x direction as the y direction, and the direction 60° clockwise to the y direction, as the z direction. Once the x, y, and z directions are defined, any hexagonal mesh arrangement of size n can be partitioned into 2n−1 rows with respect to any of the three directions. In this specific illustrative embodiment where n=3, the hexagonal mesh arrangement can be partitioned into five rows (0 to 4) in any of the three directions.

FIG. 3 illustrates schematically the rows in hexagonal mesh arrangement 30 partitioned with respect to the x, y, and z directions, respectively. In order to facilitate the disclosure herein, when an hexagonal mesh arrangement of size n is partitioned into 2n−1 rows with respect to any of the three directions, and the hexagonal mesh arrangement is rotated in such a way that the corresponding direction from the central node points to the right, the top row is referred to as row 0 in that direction, the second row to the top is referred to as row 1, and so on. Also, row n−1 is called the central row, and rows 0 to n−2 and rows n to 2n−2 will sometimes be referred to as the upper and lower parts of the hexagonal mesh arrangement, respectively. In FIG. 3, the subscripts for the row numbers are used to indicate the directions of the rows.

For sake of notational simplicity, let $[b]_a = b$ mod a, for all $a \in I^+$ and $b \in I$, where I is the set of integers and $I^+$ the set of positive integers. In order to make the hexagonal mesh arrangement homogeneous and regular, the hexagonal mesh arrangement is wrapped in such a manner that for each of the three ways of partitioning the processor nodes into rows, the last processor node in the, row i is connected to the first processor nodes of row $[i+n-1]_{2n-1}$. The processor nodes in an hexagonal mesh arrangement which is thus wrapped are homogeneous, and provide an environment in which routing and broadcasting of messages is achieved simply. In the present analysis, a wrapped hexagonal mesh arrangement of size n is denoted as $H_n$, and one which is not wrapped is denoted as $H'_n$.

Figure 4A:
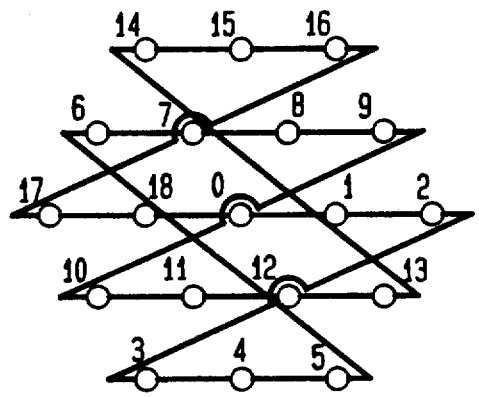
FIGS. 4a, 4b, and 4c are schematic representations of an hexagonal mesh arrangement illustrating row wrapping in the x, y, and z directions, respectively.
Figure 4B:
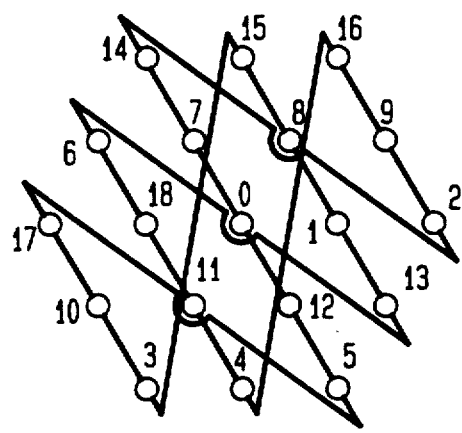
Figure 4C:
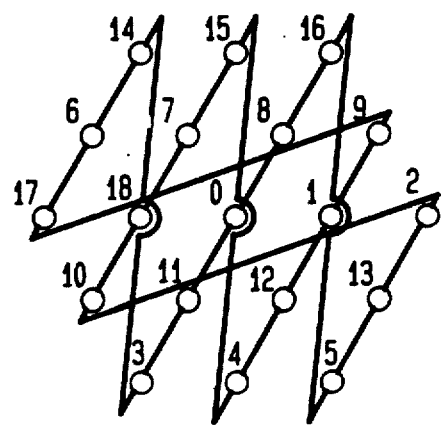

The edges in the rows partitioned with respect to the x, y, or z direction, and the associated wrapping are called the "edges" in the respective x, y, or z direction. FIGS. 4a, 4b, and 4c illustrate the partitioning edges in an $H_3$ into three different directions. These are shown separately and in respective ones of FIGS. 4a, 4b, and 4c for sake of clarity of the illustration. It can readily be observed from FIGS. 3, 4a, 4b, and 4c that there is a unique path from one processor node to another along each of the three directions.

Hexagonal mesh arrangements have specific advantageous topological properties. First, the number of nodes in an $H_n$ is $p=3n^2-3n+1$. This is readily established from the fact that there always are $n+1$ nodes in row i, as well as in row $2n-i-2$, for $0 \leq i \leq (n-2)$, and $2n-1$ processor nodes in row $n-1$. The desired result follows from:

$$\sum_{i=0}^{n-2} 2(n+i) + 2n - 1 =$$

$$2n(n-1) + (n-1)(n-2) + 2n - 1 = 3n^2 - 3n + 1$$

Further, it can easily be established that the sum of the number of processor nodes in row i and that of row $i+n$ is $3n-2$ for $0 \leq i \leq (n-2)$.

Figure 5:
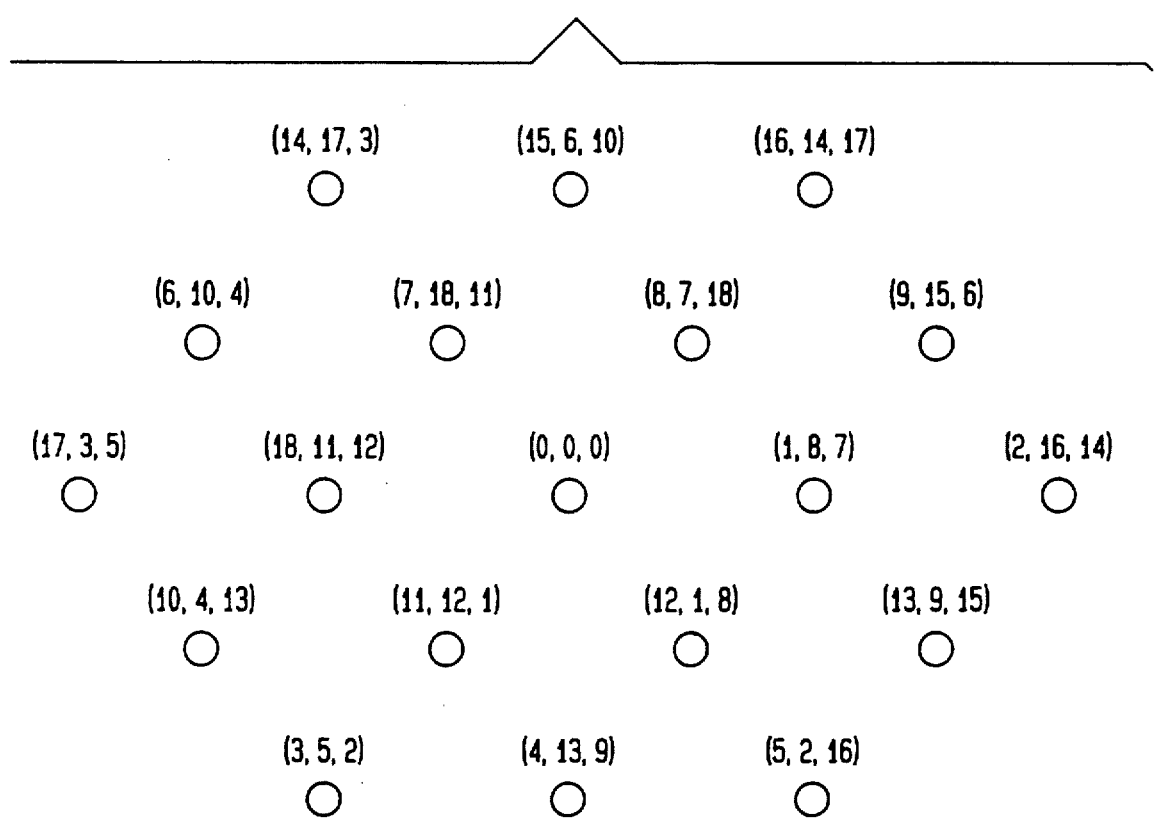
FIG. 5 is a schematic representation of an hexagonal mesh arrangement of size 3 with 3-tuple labeling.

FIG. 5 is a schematic representation of an hexagonal mesh arrangement 50 of size 3, where the edges are not drawn for sake of clarity. In order to exploit the topological properties of and hexagonal mesh arrangement, each processor node is labeled with a 3-tuple as follows: The central node of the $H_n$ is labeled (0,0,0), where the first coordinate of the processor node is referred to as the x-labeling, and the second and third coordinates are referred to as the y and z labelings, respectively. Then, move to the next processor node along the x-direction, and assign that processor node the x-labeling one more than that of its preceding processor node, and so on. The y and z labelings for each processor node are determined by moving along the y and z directions, respectively instead of the x-direction.

The present invention is premised in part on the following theorem: Let $(x_1,y_1,z_1)$ and $(x_2,y_2,z_2)$ be respectively the labeling of nodes $n_1$ and $n_2$ in an $H_n$, and $p=3n^2-3n+1$. Then, $$[x_2-x_1]_p=[(3n^2-6n+3)(y_2-y_1)]_p \quad \text{(i)}$$

$$[x_2-x_1]_p=[(3n^2-6n+2)(z_2-z_1)]_p \quad \text{(ii)}$$

This can be verified mathematically, as follows: For a pair of adjacent nodes $n_u$ and $n_v$ in the y-direction respectively with the labelings $(x_u,y,z_u)$ and $(x_v,[y+1]_p,z_v)$, it is desired to claim $[x_v-x_u]_p=3n^2-6n+3$. First, consider a path P* from $n_u$ to $n_v$ following the $+x$ direction only. As can be seen from FIG. 4a, such a path is unique. Suppose $n_u$ is in row $r_u$ according to the row partition with respect to the x-direction. Recall that the wrapping scheme requires the end of a row to be connected to the beginning of a row which is $n-1$ rows away. Since $[(n-1)(2n-3)]_{2n-1}=1$, P* must run through processor nodes in $2n-2$ rows to get from $n_u$ to $n_v$, which are adjacent in the y-direction. This includes the rows that contain $n_u$ and $n_v$. Thus, P* must visit all but:

(1) those processor nodes ahead of $n_u$ in row $r_u$;
(2) those processor nodes being $n_v$ in row $[r_u+1]_{2n-1}$, and
(3) those processor nodes in row $[r_u+n]_{2n-1}$, which is the only row that P* does not travel.

It is to be noted that if $n_u$ is in the upper part or central row of the hexagonal mesh arrangement, then the total number of nodes in (1) and (2) will be one less than the number of nodes in row $r_u$. On the other hand, if $n_u$ is in the lower part of the hexagonal mesh arrangement, then the total number of nodes in (1) and (2) will be one less than the number of nodes $[r_u+1]_{2n-1}$. It therefore can be concluded that for both cases, the total number of processor nodes in (1), (2), and (3) is $3n-3$, i.e., one less than $3n-2$. Thus, the number of processor nodes on P* is $(3n^2-3n+1)-(3n-3)=3n^2-6n+4$. Since both $n_u$ and $n_v$ are contained in P*, the claim is proved. Similarly, it can be proved in a manner similar to that set forth hereinabove that with $(x_u,y_u,z)$ and $(x_v,y_v,[z+1]_p)$, $[x_v-x_u]=3n^2-6n+2$.

Figure 6:
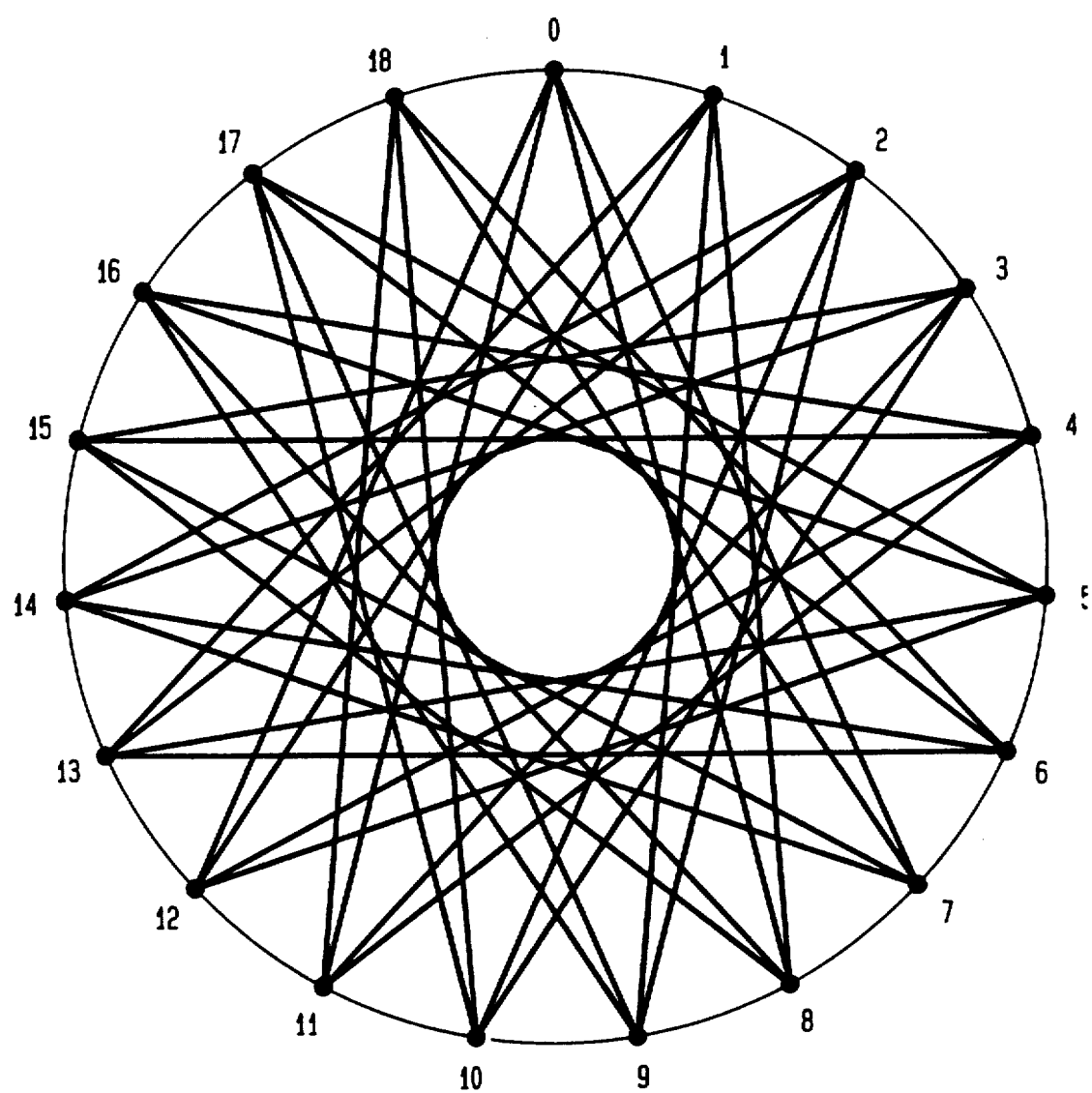
FIG. 6 is a schematic representation of an hexagonal mesh arrangement of size 3 which has been redrawn to show a circular arrangement.

It is also to be noted that $(3n^2-3n+1)-(3n^2-6n+2)=3n-1$, $(3n^2-3n+1)-(3n^2-6n+3)=3n-2$. An $H_n$ can be redrawn as a power cycle with $p=3n^2-3n+1$ processor nodes, in which node i is not only adjacent to processor nodes $[i-1]_p$ and $[i+1]_p$, but also adjacent to processor nodes $[i+3n-1]_p$, $[i+3n-2]_p$, $[i+3n^2-6n+2]_p$ and $[i+3n^2-6n+3]_p$. Thus, $H_3$ can be redrawn as set forth in FIG. 6. The connection pattern for an hexagonal mesh arrangement is novel, in that it does not belong to any previously known patterns, and as a corollary, all of the processor nodes in a wrapped hexagonal mesh arrangement ($H_n$) are homogeneous.

Certain topological characteristics of hexagonal mesh arrangements are evident:

The number of links in an $H_n'$ is $9n^2-15n+6$, while that of an $H_n$ is $9n^2-9n+3$. The diameter in an $H_n$ is $n-1$, and the average distance in an $H_n$ is $(2n-1)/3$. From these characteristics it can be established that the diameter of an hexagonal mesh arrangement with p nodes grows as $\theta(p^{\frac{1}{2}})$.

In addition to the forgoing, it should be mentioned that hexagonal mesh arrangements possess a high degree of fault-tolerance, as measured in terms of connectivity. Recall that a graph interconnection scheme is said to be m-connected (m-edge connected) if m is the minimum number of nodes (edges) the removal of which will disconnect the graph. It then can easily be verified that an hexagonal mesh arrangement of any size is 6-connected and also 6-edge connected. This means that an hexagonal mesh arrangement can tolerate up to five node/link failures at a time, which is better than most of the existing network arrangements.

In establishing an addressing scheme for hexagonal mesh arrangements which are wrapped as discussed hereinabove, it is desired to determine the shortest paths from one node to any other node using a simple algorithm. A point-to-point broad-casting algorithm is also desirable, and is discussed herein.

Figure 7A:
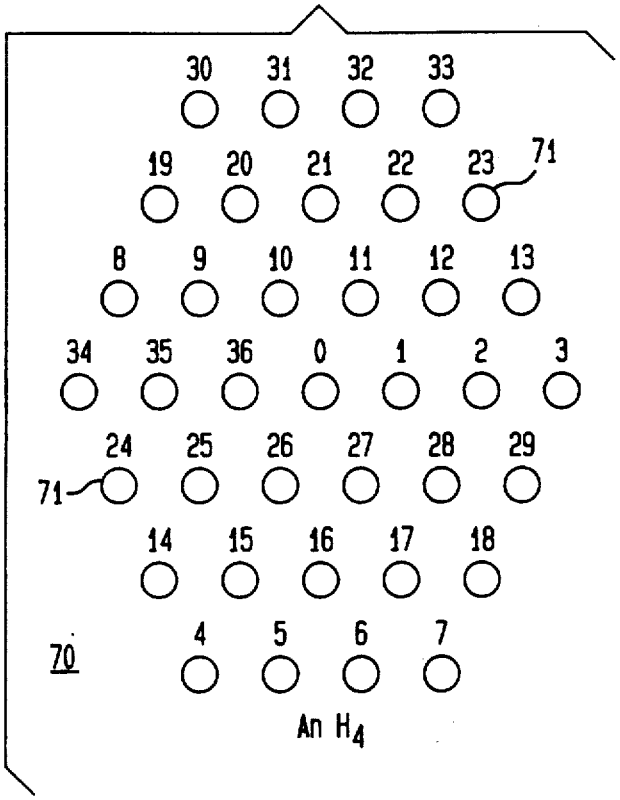
FIGS. 7a and 7b are schematic representations of an hexagonal mesh arrangement of size 4 which are useful to illustrate shifting along the x direction so as to define processor node 11 as the message-transmitting processor node.

FIG. 7a is a schematic representation of an hexagonal mesh arrangement 70 of size 4 wherein the interconnections have been omitted for clarity. As will be shown herein, the y and z labelings of any node can be obtained from its corresponding x labeling, resulting in only one labeling instead of three as sufficient to identify uniquely any node in the hexagonal mesh arrangement. This addressing scheme is therefore much simpler than schemes proposed in the prior art, since only one number, instead of two, is needed to identify each node in a hexagonal mesh arrangement. Moreover, the resulting routing strategy under this addressing scheme is far more efficient than the known schemes, especially when messages are routed via wrapped links.

As previously indicated, the shortest path between any two nodes can easily be determined by the difference of their addresses. Let $m_x$, $m_y$, and $m_z$ be respectively the numbers of moves, or hops, from the source node to the destination node along the x, y, and z directions on a shortest path. Negative values mean the moves are in opposite directions. Also, there can be several equally short paths from a node to another, and these shortest paths are completely specified by the values of $m_x$, $x_y$, and $m_z$. More specifically, it can be verified that for i=x,y,z, the number of paths with $m_i$ moves in the corresponding directions is:

$$\text{No. paths} = \frac{(|m_x| + |m_y| + |m_z|)!}{|m_x|!|m_y|!|m_z|!}$$

Let s and d be respectively the address of the source and destination processor nodes, and $k=[d-s]_p$, where $p=3n^2-3n+1$, then, the $m_x$, $m_y$, and $m_z$ for the shortest paths from s to d can be determined from the following algorithm:

$H_{n(s)}$, $m_x$ is determined by the statements in lines 2 and 3 of $A_1$, and $m_y=m_z=0$.

Consider the case when d is in a row other than n−1 of $H_{n(s)}$. Form a group of nodes with the nodes of rows n−i−2 and 2n−i−1, and call this group i. Then, in FIG. 3, rows 1 and 4 form group 0, and rows 0 and 3 form group 1. A group consists of two rows, one from the upper part and the other from the lower part of $H_{n(s)}$. Each group contains 3n−2 nodes. Then, by the statements in lines 4 and 5 of $A_1$, r is determined as the identity of the group which contains d in $H_{n(s)}$, and t is the position of d in group r. We can determine from t which row of $H_{n(s)}$ contains d. Denote the first node of that row by $n_f$. A shortest path from s to $n_f$ and that from $n_f$ to d can thus be determined. Using the concept of the composition of vectors, one obtains the desired equations for $m_x$, $m_y$, and $m_z$.

Figure 7B:
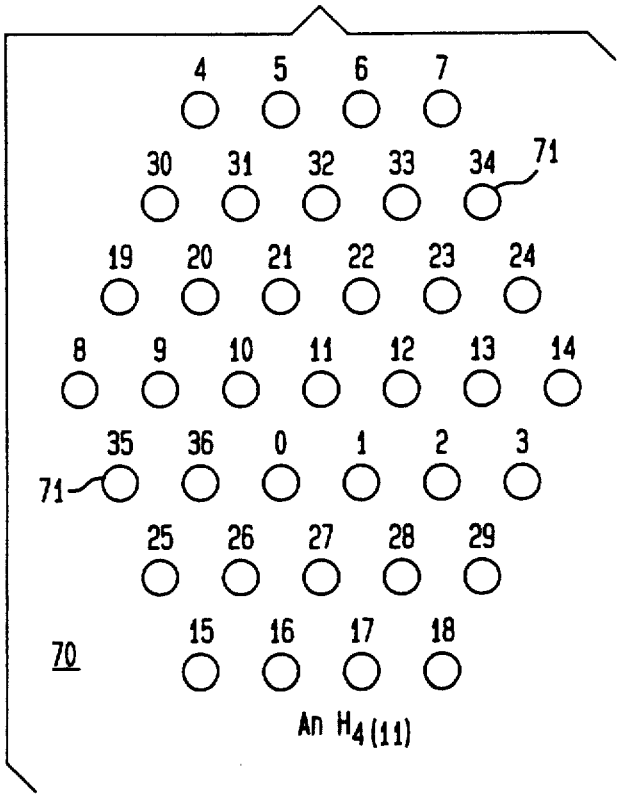

FIG. 7 illustrates an example of routing in an hexagonal mesh arrangement of size 4. Suppose processor node 11 sends a message to processor node 5, i.e., n=4, s=11, d=5, and $k=[5-11]_{37}=31$. The original hexagonal mesh arrangement is shown in FIG. 7a, and the hexagonal mesh arrangement with processor node 11 in the center thereof is shown in FIG. 7b. From algorithm $A_1$, one obtains r=2, t=7, and then $m_x=0$, $m_y=-2$, and $m_z=-1$. Note that the route from processor node 11 to processor node 5 is isomorphic to that from node 0 to node 31. This is not a coincidence, but rather is a consequence of the homogeneity of $H_4$. All paths from one node to another in an $H_n$ are completely determined by the difference in their addresses.

In addition, the complexity of algorithm $A_1$ is Zero(1) which is independent of the size of the hexagonal mesh arrangement, and the needs of the source processor node in executing the algorithm. Once $m_x$, $m_y$, and $m_z$

---

Algorithm $A_1$

```
begin
    m_x := 0; m_y := 0; m_z := 0
    if (k < n) then begin m_x := k; stop end;
    if (k > 3n^2 - 4n + 1) then begin m_n = k - 3n^2 + n - 1; stop end;
    r := (k - n) div (3n - 2);
    t := (k - n) mod (3n - 2);
    if (t ≦ n + r - 1)
        then /* d is the lower part of the hexagonal mesh
        centered at s. */
            if (t ≦ r)
                then m_x := t - r; m_z := n - r - 1
                else if (t ≧ n - 1) then m_x := t - n + 1; m_y := n - r - 1;
                        else m_y := t - r; m_z := n - t - 1
                endif;
            endif;
        else /* d is in the upper part of the hexagonal mesh
        centered at s. */
            if (t ≦ 2n - 2)
                then m_x := t + 2 - 2n; m_y := -r - 1;
                else if (t ≧ 2n + r - 1) then m_x := t - 2n - r + 1;
                        m_z := -r - 1;
                        else m_y := t + 1 - 2n - r; m_z := 2n - t - 2;
            endif;
        endif;
    endif;
    stop;
end;
```

---

The correctness of Algorithm $A_1$ can be established mathematically, as follows: The source processor node can view itself as the central processor node of the hexagonal mesh arrangement ($H_n$). Let $H_{n(s)}$ be the hexagonal mesh arrangement $H_n$ centered at s. For the case when d is in the central row (i.e., row n−1) of are determined, they form a routing record to be sent along with a regular message. The routing in an $H_n$ is then characterized by the following six routing functions:

$$R_{mx-1}(i) = [i+1]_p$$

$R_{m_x+1}(i) = [i-1]_p$ $R_{m_y-1}(i) = [i+3n^2-6n+3]_p$ $R_{m_y+1}(i) = [i+3n-2]_p$ $R_{m_z-1}(i) = [i+3n^2-6n+2]_p$ $R_{m_z+1}(i) = [i+3n-1]_p$ where, as before, $p = 3n^2 - 3n + 1$ is the total number of processor nodes in an hexagonal mesh arrangement of size n, $H_n$.

The routing record is updated by the above six functions at each intermediate processor node on the way to the destination processor node so that the current routing record may contain the correct information for the remaining portion of the path. The above functions are applied repeatedly until $m_x = m_y = m_z = 0$, meaning that the message has reached the destination processor node.

Applications in various domains require an efficient method for broadcasting messages to every processor node in an hexagonal mesh arrangement. As a result of interconnection costs, it is quite common to use point-to-point communications for broadcasting. Such broadcasting can be used in hexagonal mesh arrangements.

Figure 8:
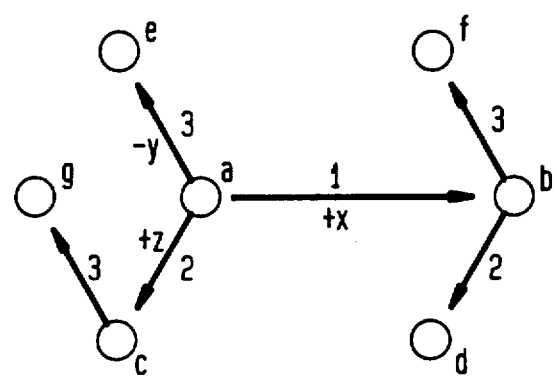
FIG. 8 is a schematic representation of an initial phase of a broadcasting algorithm.

One can assume the center node to be the source node of the broadcast. The set of processor nodes which have the same distance from the source processor node is called a "ring." The primary concept of the present algorithm is to broadcast a message, ring-by-ring, toward a periphery of the hexagonal mesh arrangement. The algorithm consists of two phases. In the first phase, which takes three steps, the message is transmitted to the six nearest neighbors of the origin. FIG. 8 is a schematic diagram which illustrates, by way of arrows, the manner in which a processor node sends a message along the +x direction to a processor node b. Processor nodes a and b send messages along the z direction to processor nodes c and d, respectively in step 2, and then processor nodes a, b, and c send messages along the y direction to processor nodes e, f, and g, respectively in step 3. Upon completion of this phase, processor nodes b, c, d, e, f, and g are assigned to the directions x, z, y, −y, −z, and −x, respectively as the direction of propagation.

Figure 9:
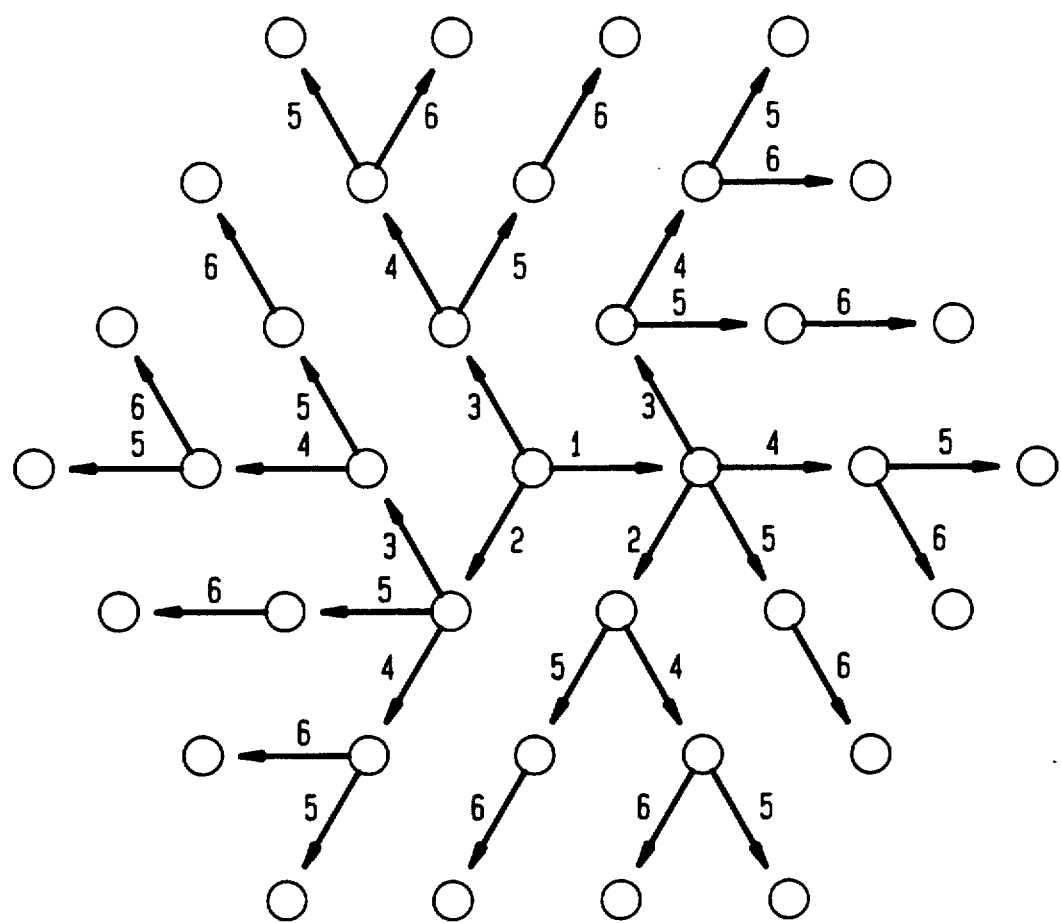
FIG. 9 is a schematic representation of an hexagonal mesh arrangement of size 4 illustrating broadcasting therein.
Figure 10A:
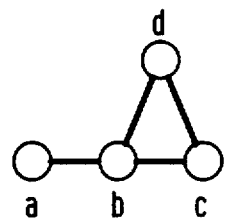
FIGS. 10a–10f illustrate six possible patterns after two communication steps.
Figure 10B:
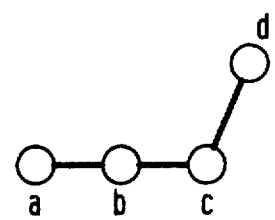
Figure 10C:
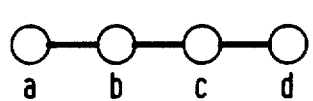
Figure 10D:
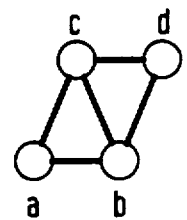
Figure 10E:
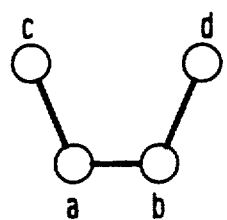
Figure 10F:
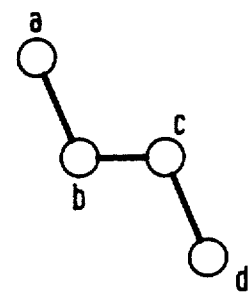
Figure 11A:
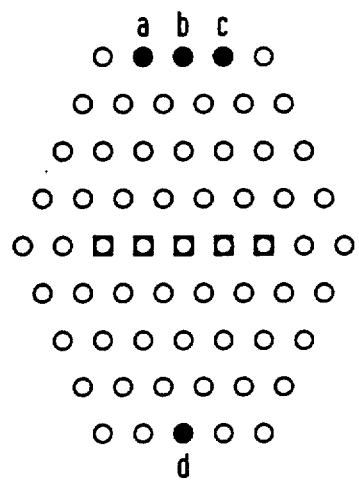
FIG. 11a–11f are a schematic representation of an hexagonal mesh arrangement of size 5 illustrating the six patterns of FIGS. 10a–10f.
Figure 11B:
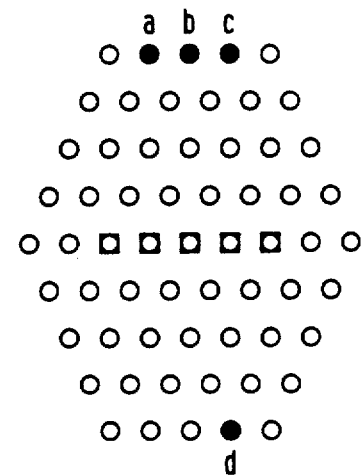
Figure 11C:
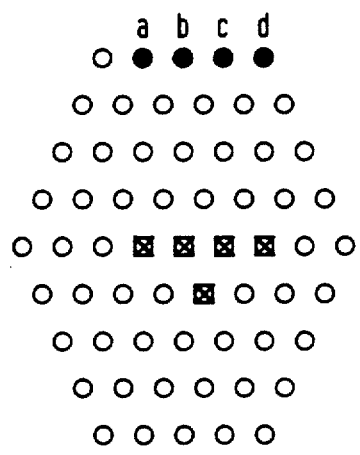
Figure 11D:
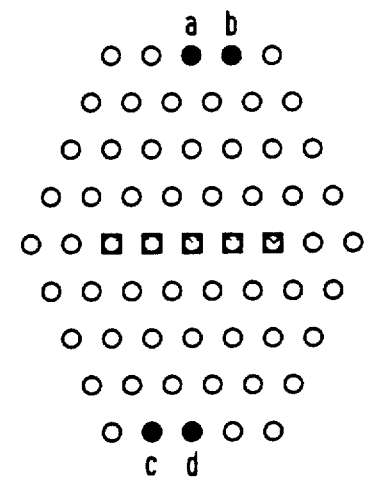
Figure 11E:
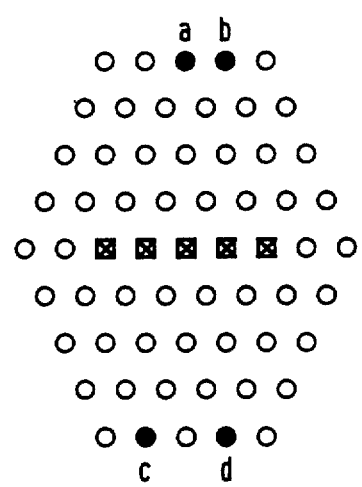
Figure 11F:
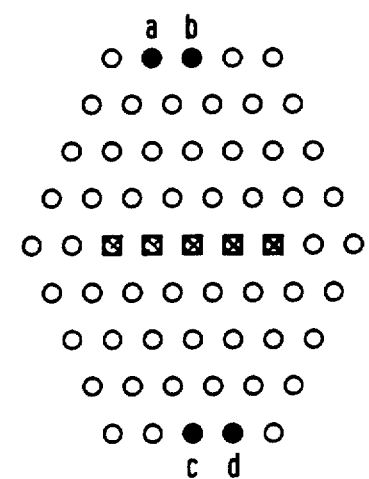

There are six corner processor nodes in each ring. In the second phase of the algorithm, which takes n−1 steps, the six corner nodes of each ring send a message to two neighboring processor nodes, respectively, while all the other nodes propagate the message to the next processor node along the direction in which the message was previously sent. FIG. 9 is a schematic representation of an hexagonal mesh arrangement of size 4 which illustrates, by way of arrows, the broadcasting of a message in accordance with the present aspect of the invention. As will be set forth hereinbelow, the process is described in an algorithm $A_2$, where the five arguments in the "send" and "receive" commands denote respectively the message to be broadcast, the direction from which the message is received, the direction in which to propagate the message, a flag indicating whether it is a corner node or not, and a count of communication steps. Moreover, the function "rotate" is used for each corner node to determine the direction of the second transmission, in which the direction is rotated clockwise. For example, y = rotate(x+60°), z = rotate(y+60°) and −x = rotate(z+60°). Algorithm $A_2$:

```
Procedure for the source node
begin
        send(message, x, x, TRUE, 1);
        send(message, z, z, TRUE, 2);
        send(message, −y, −y, TRUE, 3);
end
Procedure for all nodes except the source node
begin
        receive(message, z, y, TRUE, 2);
        case count of
        1:  begin
                send(message, z, y, TRUE, 2);
                send(message, −y, −z,3);
            end
        2:  begin
                if (from-dirn=z) then send(message, −y, −x, TRUE, 3);
                count:=3;
            end
        n+2: stop     /*test for termination*/
        else:         /*do nothing*/
        endcase
        /*steps of the second phase*/
        if (corner) and (count ≦ n+1) then
        begin
                direction−2 = rotate(propagate-dirn, +60°);
                send(message, propagate-dirn, propagate-dirn, TRUE, count+1);
                send(message, direction-2, direction-2, FALSE, count+2);
        end
        else  send(message, propagate-dirn, propagate-dirn, FALSE, count+1);
end
```

Note that the second phase is required only when n>2. Thus, the total number of communication steps is n+2 when n≧3, and 3 when n=2. Furthermore, we prove by the following theorem that $A_2$ is an optimal broadcasting algorithm in the number of required communication steps. Any broadcast algorithm for the hexagonal mesh $H_n$, n≧3, which uses point-to-point communication requires at least n+2 communication steps.

It is first necessary to prove the foregoing result for hexagonal mesh arrangements for sizes 3 and 4. An hexagonal mesh arrangement of size 3 has 19 nodes, and therefore, even if recursive doubling were to be used for each step of broadcasting, at least five steps are required to cover all of the nodes. Similarly, for an hexagonal mesh arrangement of size 4 which has 37 nodes, at least 6 steps are required. For larger values of n, it can be shown that it is not possible to cover all processor nodes in n+1 steps.

In order to show this, all possible patterns of nodes which can be reached using two communication steps are examined. In two steps, only four nodes can be reached and then the duplicate patterns arising as a result of various symmetries are removed. This results in only six unique patterns which are shown in FIGS. 10a-10f. FIGS. 10a-10f are a schematic representation which illustrates the six possible patterns after only two communication steps. These patterns can each be mapped into the node on the periphery of an hexagonal mesh arrangement, and in each case, at least five possible nodes which are n−1 links away from each of the four mapped nodes can be found. At most four nodes of these five can be reached in n−1 steps from the original four nodes since only point-to-point communication is permitted. Hence, there is at least one node which cannot be reached in n+1 steps. Therefore, at least n+2 steps are required.

FIGS. 11a-11f are a schematic representation of an hexagonal mesh arrangement of size 5 illustrating the six possible patterns mapped thereon. It is evident from this figure that a similar mapping would apply for all larger hexagonal mesh arrangements.

In order to see an application of the broadcasting algorithm, first consider the problem of computing the sum of numbers distributed across the nodes in an hexagonal mesh arrangement. Note that this problem is important since it occurs frequently in many applications such as the computation of an inner product of two vectors. The global sum can be obtained by first computing the inner product within each processor node for the segments of the vectors in the node, and then summing these partial sums up. Typically, for vector operations, the inner product is required by all nodes. In light of the broadcasting algorithm, the procedure for obtaining the global sum can be accomplished systematically by 2n+1 communication steps as described below.

Figure 12:
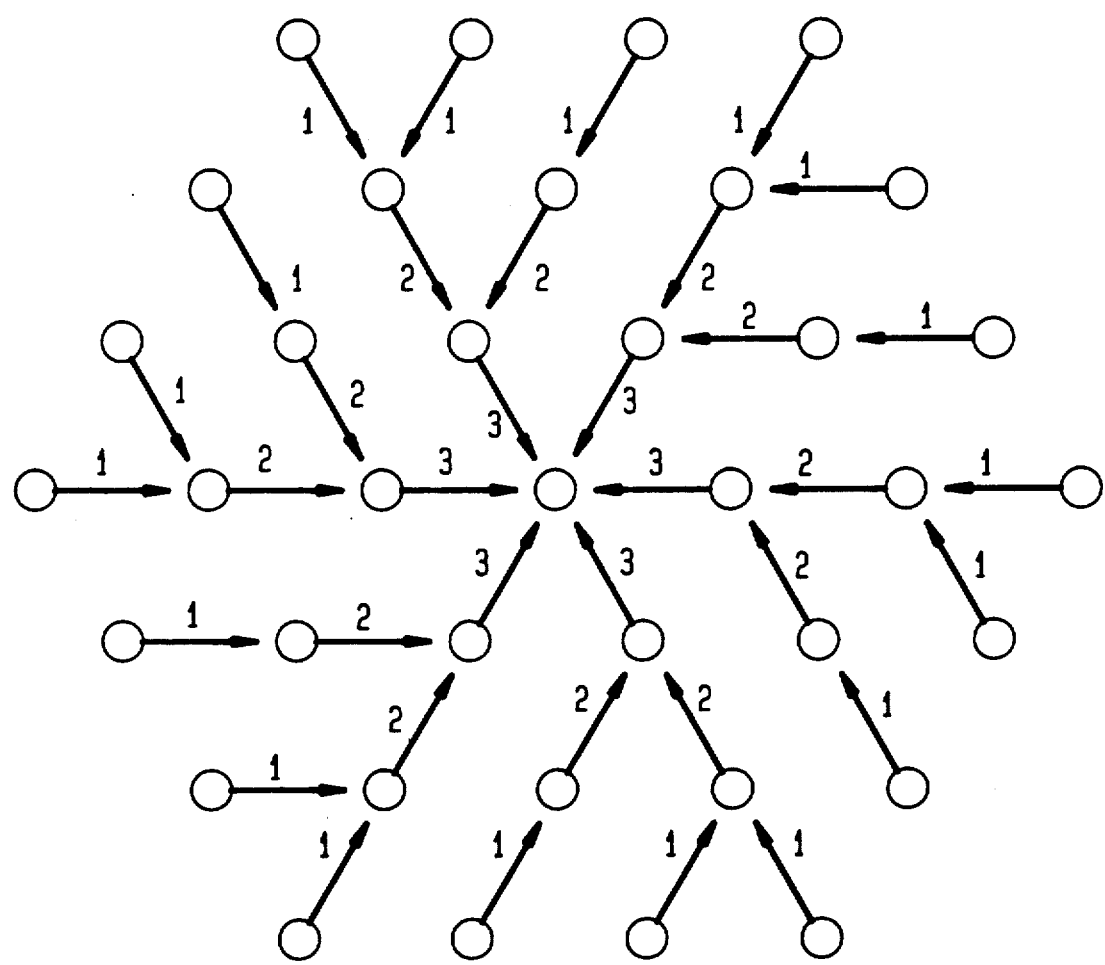
FIG. 12 is a schematic representation of an hexagonal mesh arrangement of size 4 illustrating the first phase of a global sum algorithm.

The procedure can be divided into two phases. In the first phase, the partial sums are transmitted toward a center node, while each node along the path computes the path of all incoming partial sums and its own number, and then transmits the partial sum inward. FIG. 12 is a schematic representation of an hexagonal mesh arrangement of size 4 which illustrates the first phase of the global sum algorithm. From this figure, it can easily be seen that the first phase requires n−1 communication steps in an hexagonal mesh arrangement of size n. In a second phase, the center processor node, after adding the six incoming partial sums with its own number, uses the point-to-point broadcasting to distribute the sum to all processor nodes. Since one needs n+2 steps in the second phase, the total number of required communication steps for obtaining the global sum is 2n+1.

It is essential that messages in a large multiprocessor network be routed by each intermediate processor node without using information about the entire network, since large storage and time overheads are required for maintaining such global information. The wrapped hexagonal mesh arrangement of the present invention not only provides regularity and homogeneity to the interconnection network, but also allows for a very simple addressing scheme which completely specifies all shortest paths from one processor node to any other processor node using only the addresses of the source-destination pair. The shortest paths can then be computed with a simple and novel algorithm which provides the significant advantages set forth herein.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of connecting $3n^2-3n+1$ processor nodes, and communicating among same, the method comprising the relational steps of:

interconnecting said processor nodes to one another in an hexagonal mesh arrangement ($H_n$) in which each edge of said hexagonal mesh has n processor nodes therein;

defining 2n−1 x-rows of the processor nodes in an x direction, each of said 2n−1 x-rows being designated by an address of "0" to an address designated by a value 2n−2, a center one of said 2n−1 x-rows being designated by a value n−1, each of said x-rows having first end and second end processor nodes therein;

wrapping said x-rows by coupling each of said second end processor nodes in each x-row to a respective first end processor node in an x-row which is n−1 x-rows away;

determining 2n−1 y-rows of the processor nodes in a y direction, each of said 2n−1 y-rows being designated by an address of "0" to an address designated by a value 2n−2, a center one of said 2n−1 y-rows being designated by a value n−1, each of said y-rows having first end and second end processor nodes therein;

wrapping said y-rows by coupling each of said second end processor nodes in each y-row to a respective first end processor node in a y-row which is n−1 y-rows away;

determining 2n−1 z-rows of the processor nodes in a z direction, each of said 2n−1 z-rows being designated by an address of "0" to an address designated by a value 2n−2, a center one of said 2n-31 1 z-rows being designated by a value n−1, each of said z-rows having first end and second end processor nodes therein; and wrapping said z-rows by coupling each of said second end processor nodes in each z-row to a respective first end processor node in a z-row is n−1 z-rows away, whereby a wrapped hexagonal mesh arrangement is produced.

2. The method of claim 1 wherein there are provided the further steps of:

forming a memory model of said wrapped hexagonal mesh arrangement and storing same in a memory associated with a message-transmitting one of said processor nodes; and determining said message-transmitting one of said processor nodes to be disposed in a central location in said memory model.

3. The method of claim 2 wherein there are provided the further steps of:
transmitting routing data which identifies a message path to be followed by said message to said receiver processor node; and
transmitting from said message-transmitting one of said processor modes a message to be received by a receiver one of said processor nodes.

4. The method of claim 3 wherein said step of transmitting routing data is performed concurrently with said step of message-transmitting.

5. The method of claim 3 wherein said routing data corresponds to ones of processor nodes which said message will encounter as it travels toward said receiver processor node along said message path.

6. The method of claim 5 wherein said routing data corresponds to a routing data value, and there is provided the further step of decrementing said routing data value at each processor node encountered by said message on said message path.

7. The method of claim 6 wherein said routing data includes x-data corresponding to a number of processor nodes encountered by said message along said x-direction of said message path, y-data corresponding to said number of processor nodes encountered by said message along said y-direction of said message path, and z-data corresponding to a number of processor nodes encountered by said message along said z-direction of said message path.

8. The method of claim 3 wherein, prior to performing said step of transmitting routing data there are provided the further steps of:
assigning to each of the $3n^2 - 3n + 1$ processor nodes a unique address value, said address values being sequential from a central processor node location where said center one of said $2n-1$ x-rows, said center one of said $2n-1$ y-rows, and said center one of said $2n-1$ z-rows intersect one another, along all of said x-wrapped x-rows to a final processor node location; and
computing said routing data which identifies a message path to be taken by said message to said receiver processor node, in response to said address values.

9. The method of claim 8 wherein there are provided the further steps of:
presetting a parameter $m_x = 0$, said parameter $m_x$ corresponding to a number of processor nodes encountered by said message along said z-direction of said message path;
presetting a parameter $m_y = 0$, said parameter $m_y$ corresponding to a number of processor nodes encountered by said message along said y-direction of said message path; and
presetting a parameter $m_z = 0$, said parameter $m_z$ corresponding to a number of processor nodes encountered by said message along said z-direction of said message path.

10. The method of claim 9 wherein said step of computing said routing data comprises the steps of:
setting a parameter n to a value corresponding to the number of processor nodes along on edge of said hexagonal mesh arrangement;
setting a parameter p to a value $3n^2 - 3n + 1$ corresponding to the number of the processor nodes in said hexagonal mesh arrangement;
setting a parameter s to a value corresponding to an address value of said message-transmitting processor node;
setting a value d as corresponding to an address value of a destination processor node, said message path being between said message-transmitting processor node having address s and said receiver processor node having address d;
setting a parameter k to a value $k = [d-]$ modulo p;
comparing k to n; and if $k < n$, x-setting $m_x = k$, and if $k > 3n^2 - 4n + 1$, setting $m_n - 3n^2 - 3n + 1$, where $m_x$ is a number of processor nodes encountered by said message along an x-direction of said characteristic message path.

11. The method of claim 10 wherein there are provided the further steps of:
hexagonal mesh rotating in said memory model said processor nodes along said x-wrapped x-rows whereby said transmitting processor node having its unique address value associated therewith assumes said central processor node location where said center one of said $2n-1$ x-rows, said center one of said $2n-1$ y-rows, and said center one of said $2n-1$ z-rows intersect one another;
first defining a first part of said hexagonal mesh arrangement with respect to said transmitting processor node defined to be in said central processor node location, said first part of said hexagonal mesh arrangement corresponding to x-rows 0 to $n-2$;
second defining a second part of said hexagonal mesh arrangement with respect to said transmitting processor node defined to be in said central processor node location, said second part of said hexagonal mesh arrangement corresponding to x-rows n to $2n-2$;
determining a parameter r having a value $k-n$ divided by $3n-2$; and
determining a parameter t having a value $k-n$ modulo $3n-2$.

12. The method of claim 11 wherein said receiver processor node is in said first part of said hexagonal mesh arrangement and there is provided the further step of first resetting:
$m_x = t - r$ and $m_z = n - r - 1$ if $t \leq n + r - 1$ and $t \leq r$;
$m_x = t - n + 1$ and $m_y = n - r - 1$ if $t \leq n + r - 1$ and $t \geq n - 1$; and
$m_y = t - r$ and $m_z = n - t - 1$ if $t \leq n + r - 1$ and $t < n - 1$.

13. The method of claim 11 wherein said receiver processor mode is in said second part of said hexagonal mesh arrangement and there is provided the further step of second resetting:
$m_x = t + 2 - 2n$ and $m_y = -r - 1$ if $t > n + r - 1$ and $t \leq 2n - 2$;
$m_x = t - 2n + 1$ and $m_z = -r - 1$ if $t > n + r - 1$ and $t \geq 2n + r - 1$; and
$m_y = t + 1 - 2n - r$ and $m_z = 2n - t - 2$ if $t > n + r - 1$ and $t < 2n + r -$.

14. The method of claim 2 wherein there is provided the further step of:
broadcasting to all of said processor nodes a message from said message-transmitting processor node in said central location of said memory model of said hexagonal mesh arrangement, said step of broadcasting comprising the further steps of:

determining a plurality of hexagonal rings in said hexagonal mesh arrangement about said message-transmitting processor node, all of said processor nodes in each of said rings being of equal distance from said message-transmitting processor node; and transmitting said message from said message-transmitting processor node toward the periphery of said hexagonal mesh arrangement.

15. The method of claim 14 wherein said step of transmitting comprises the further steps of:

first transmitting said message to a predetermined number of nearest processor node neighbors of an originating processor node; and second transmitting from other originating processor nodes located at corner nodes of at least one of said hexagonal rings to a neighboring processor node.

16. A method of connecting a plurality of processor nodes, the method comprising the relational steps of:

interconnecting said processor nodes to one another in an hexagonal mesh arrangement ($H_n$) in which each edge of said hexagonal mesh has n processor nodes therein;

defining x, y, and z directions in said hexagonal mesh arrangement;

defining a plurality of rows of the processor nodes in said x, y, and z directions, whereby a plurality of x-rows, y-rows, and z-rows are defined, each of said rows having first end and second end processor nodes therein;

wrapping said rows in said x, y, and z directions by coupling each of said second end processor nodes in each such defined row to a respective first end processor node in a corresponding type of row which is n−1 such rows away;

assigning to each of the processor nodes a unique address value, said address values being sequential from a central processor node location where said x, y, and z rows intersect one another, to a final processor node location; and rotating said hexagonal mesh arrangement along said x-wrapped x-rows whereby a predetermined processor node having its unique address value associated therewith which intends to transmit a message is arranged in said central processor node location in said hexagonal mesh arrangement.

17. The method of claim 16 wherein there are provided the further steps of:

selecting a predetermined one of the processor nodes as a receiver processor node for receiving a message from said central processor node, said receiver processor node having a unique address value associated therewith; and determining message-path data corresponding to a message path between said central processor node and said receiver processor node in terms of minimum numbers of processor node jumps along said x, y, and z directions of said hexagonal mesh arrangement.

18. The method of claim 17 wherein said step of determining is performed using said unique address values.

19. The method of claim 17 wherein there is provided the further step of updating said message-path data at each of said processor nodes intermediate of said message-transmitting processor node and said receiver processor node.

20. The method of claim 16 wherein there are provided the further steps of:

determining a processor node ring wherein each processor node therein has an equal distance from said central processor node;

first transmitting said message to a predetermined number of nearest message-recipient processor node neighbors of said message-transmitting processor node; and retransmitting said message from ones of said message-recipient processor nodes located at corner nodes of said processor node ring to a neighboring processor node.

* * * * *

UNITED STATES PATENT AND TRADEMARK OFFICE
CERTIFICATE OF CORRECTION

PATENT NO.  :  5,101,480
DATED       :  March 31, 1992
INVENTOR(S) :  Shin, et al.

It is certified that error appears in the above-identified patent and that said Letters Patent is hereby corrected as shown below:

Col. 1, line 6, after "made" insert -- with government support --;

Col. 1, line 7, change "Control" to -- contract --;

Col. 1, lines 52, change "A" to -- a --;

Col. 3, line 61, change "$m_n = 3n^2 - 3n + 1$" to -- $m_n = k - 3n^2 - 3n + 1$ --;

Col. 4, line 9, change "$m_z =\ _n - t - 1$" to -- $m_z = n - t - 1$ --;

Col. 4, line 10, change "$t > n$" to -- $t > r$ --;

Col. 4, line 16, change "$m_x = t - 2n - n + 1$" to -- $m_x = t - 2n - r + 1$ --;

Col. 5, line 5, delete "a";

Col. 7, line 4, delete ",";

Col. 9, line 24, Change "$x_y$" to -- $m_y$ --;

Col. 9, under "Algorithm $A_1$," line 4, change "$m_n = k - 3n^2 + n - 1$" to -- $m_n = k - 3n^2 - 3n + 1$ --;

UNITED STATES PATENT AND TRADEMARK OFFICE
CERTIFICATE OF CORRECTION

PATENT NO. : 5,101,480

DATED : March 31, 1992

INVENTOR(S) : Shin, *et al.*

Page 2 of 4

It is certified that error appears in the above-identified patent and that said Letters Patent is hereby corrected as shown below:

Column 10, line 66, delete

"$R_{mx-1}(i) = [i+1]_p$"

and insert therefor:

-- $R_{m_x-1}(i) = [i+1]_p$ --;

Column 11, line 1, delete

"$R_{mx+1}(i) = [i-1]_p$"

and insert therefor:

-- $R_{m_x+1}(i) = [i-1]_p$ --;

Column 11, line 2, delete

"$R_{my-1}(i) = [i+3n^2-6n+3]_p$"

and insert therefor:

-- $R_{m_y-1}(i) = [i+3n^2-6n+3]_p$ --;

Column 11, line 3, delete

"$R_{my+1}(i) = [i+3n-2]_p$"

and insert therefor:

-- $R_{m_y+1}(i) = [i+3n-2]_p$ --;

UNITED STATES PATENT AND TRADEMARK OFFICE
CERTIFICATE OF CORRECTION

PATENT NO. : 5,101,480

DATED : March 31, 1992

INVENTOR(S) : Shin, et al.

It is certified that error appears in the above-identified patent and that said Letters Patent is hereby corrected as shown below:

Column 11, line 4, delete

"$R_{mz-1}(i) = [i+3n^2-6n+2]_p$"

and insert therefor:

-- $R_{m_z-1}(i) = [i+3n^2-6n+2]_p$ --;

Column 11, line 5, delete

"$R_{mz+1}(i) = [i+3n-1]_p$"

and insert therefor:

-- $R_{m_z+1}(i) = [i+3n-1]_p$ --;

Claim 3, line 7, change "modes" to -- nodes --;

Claim 10, line 17, change "[d-] to -- [d-s] --;

Claim 12, line 8, change "$m_z = {}_n - t - 1$" to -- $m_z = n - t - 1$ --; and

UNITED STATES PATENT AND TRADEMARK OFFICE
CERTIFICATE OF CORRECTION

PATENT NO. : 5,101,480
DATED : March 31, 1992
INVENTOR(S) : Shin, et al

It is certified that error appears in the above-indentified patent and that said Letters Patent is hereby corrected as shown below:

Claim 13, line 10, change "$t<2n + r -$" to $t<2n + r - 1$--.

Signed and Sealed this

Seventeenth Day of May, 1994

*Attest:*

BRUCE LEHMAN

*Attesting Officer*     *Commissioner of Patents and Trademarks*